May 30, 1933.  L. D. SOUBIER  1,912,018
MACHINE FOR FORMING HOLLOW GLASS ARTICLES
Filed June 27, 1930  7 Sheets-Sheet 4

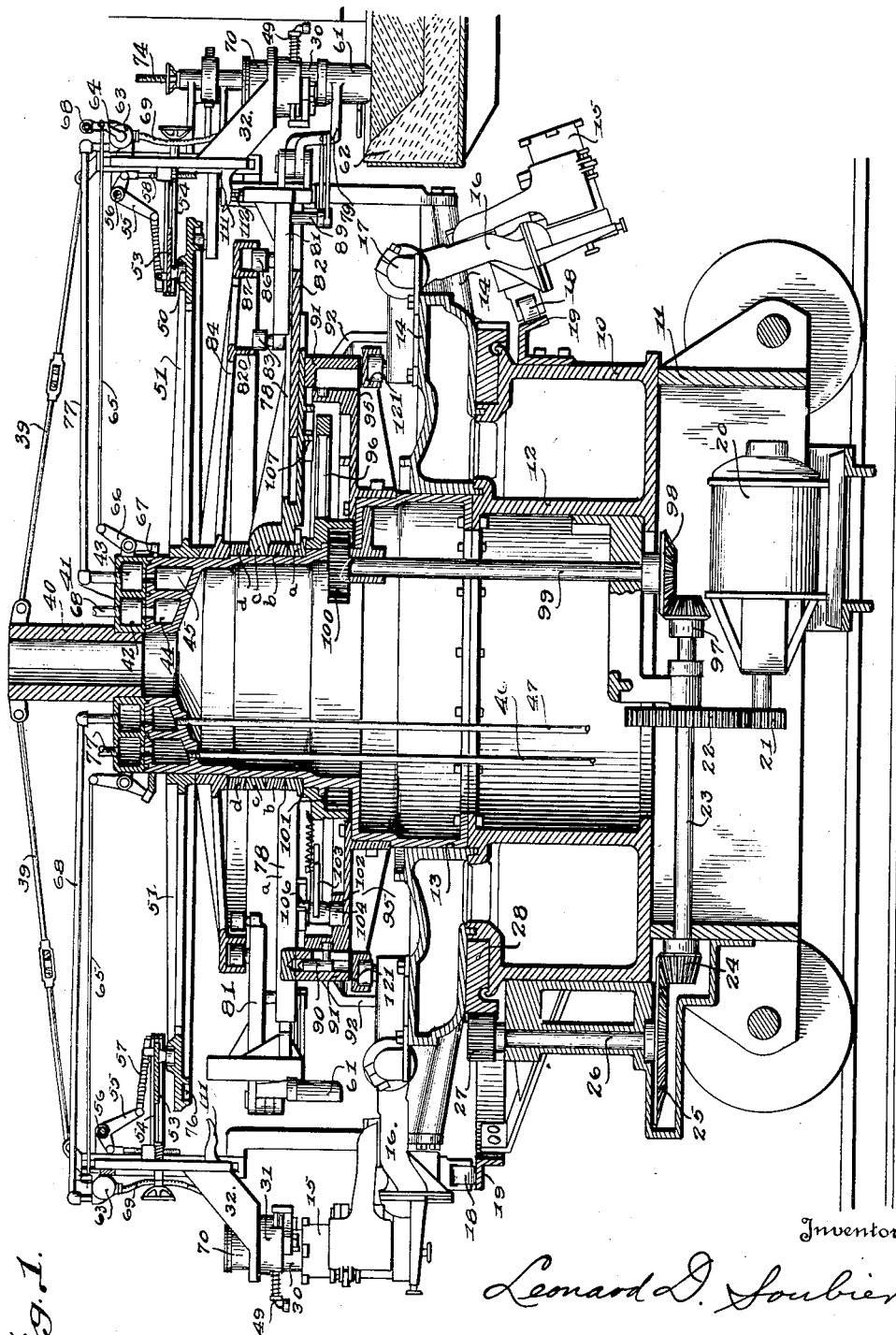

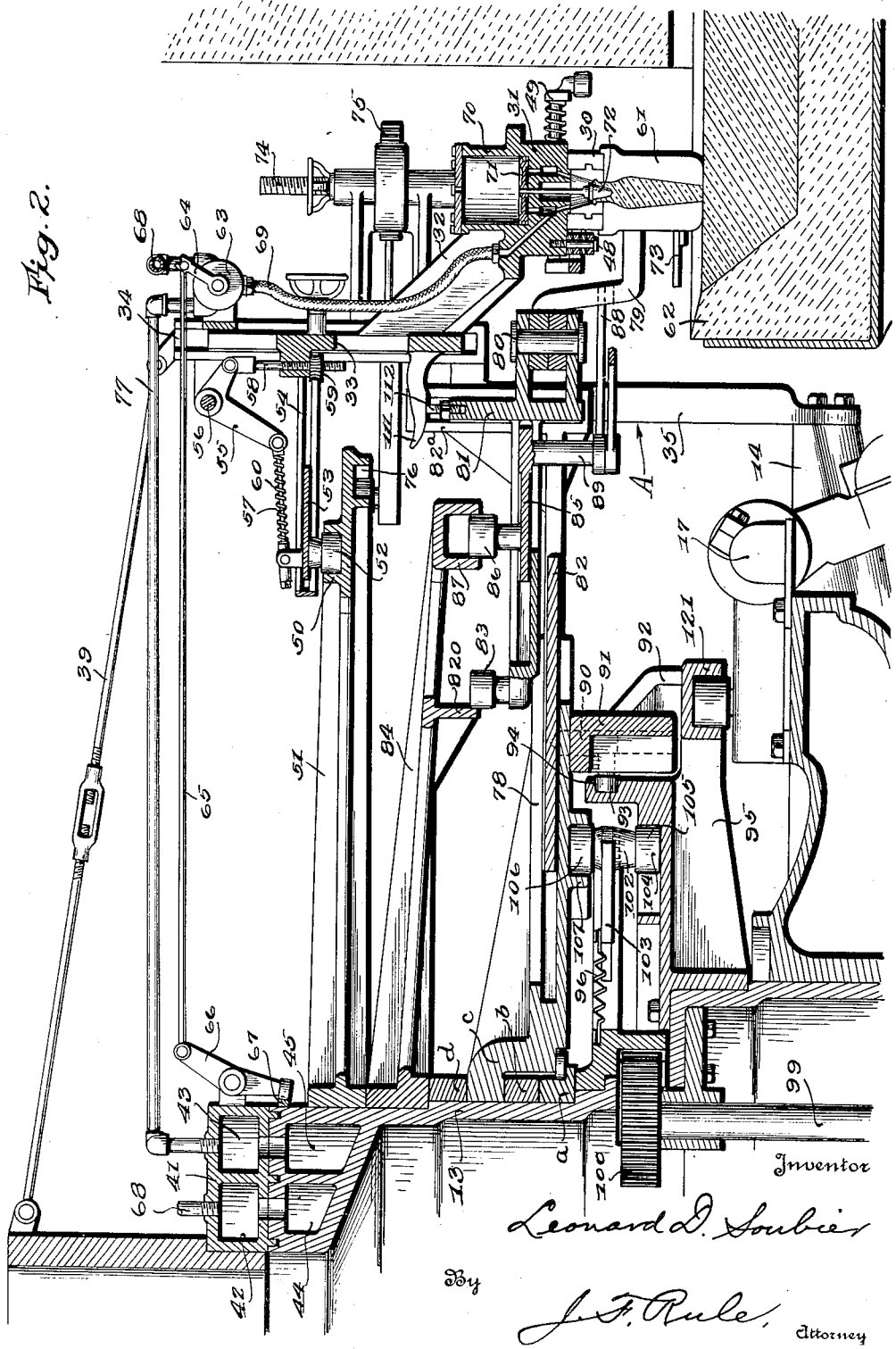

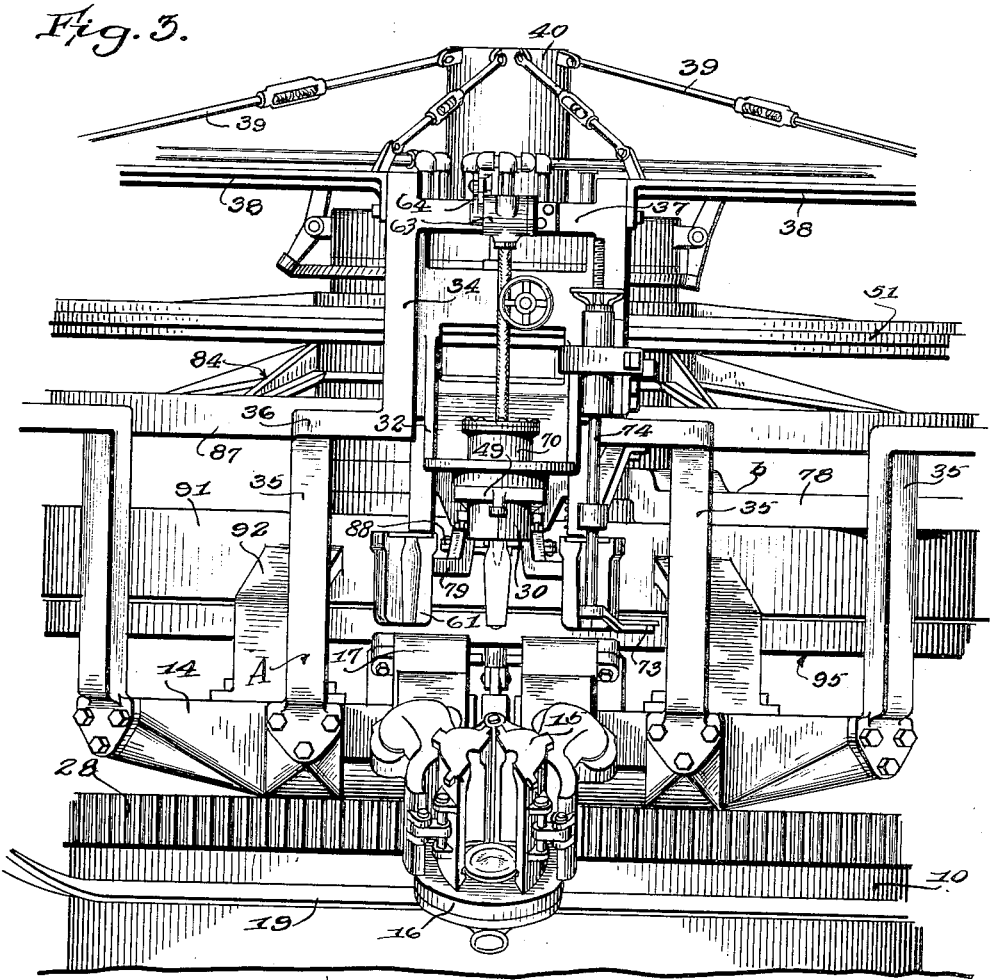

Inventor
Leonard D. Soubier
By J. F. Rule,
Attorney

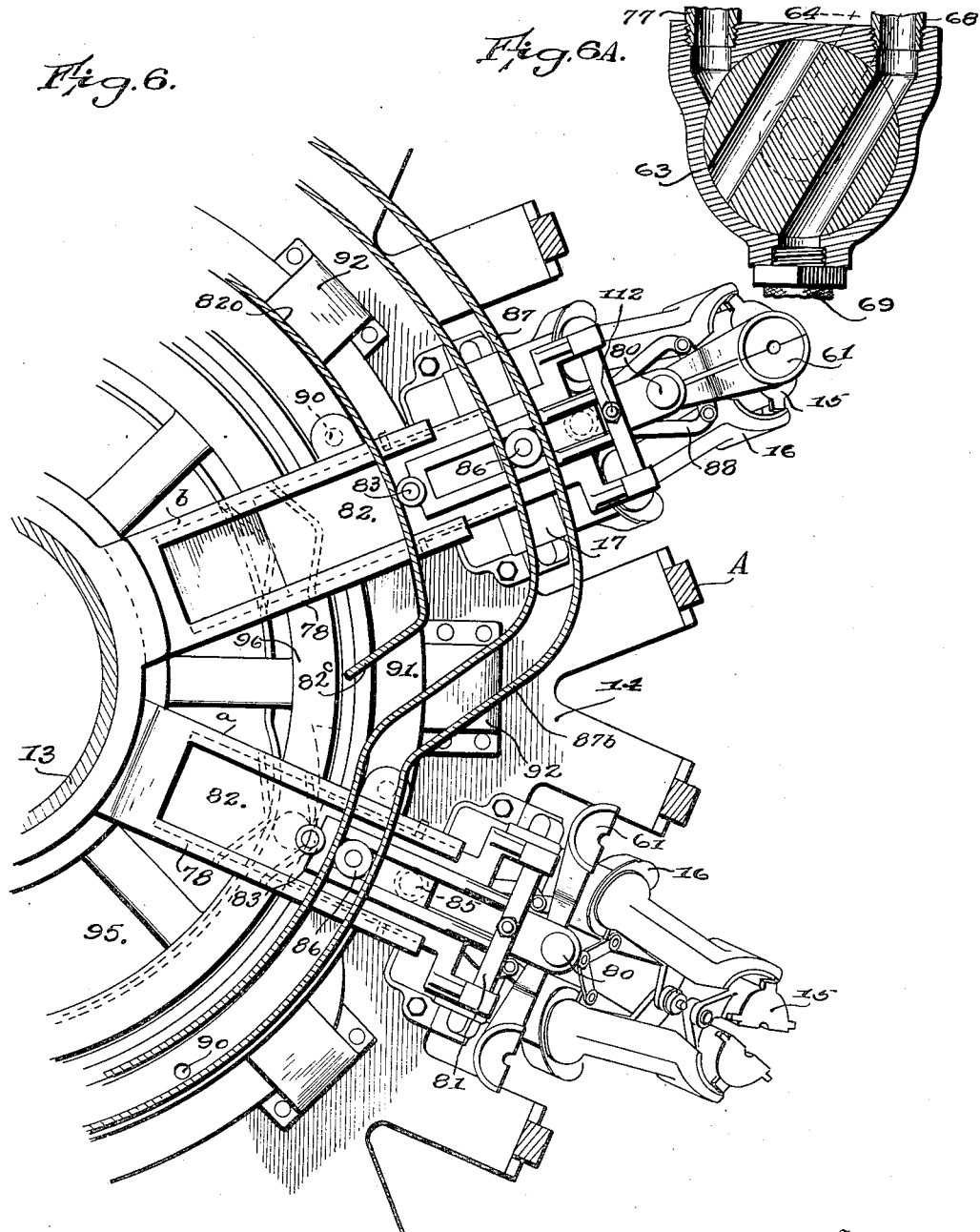

May 30, 1933.  L. D. SOUBIER  1,912,018
MACHINE FOR FORMING HOLLOW GLASS ARTICLES
Filed June 27, 1930   7 Sheets-Sheet 6

Inventor
Leonard D. Soubier
By J. F. Rule,
Attorney

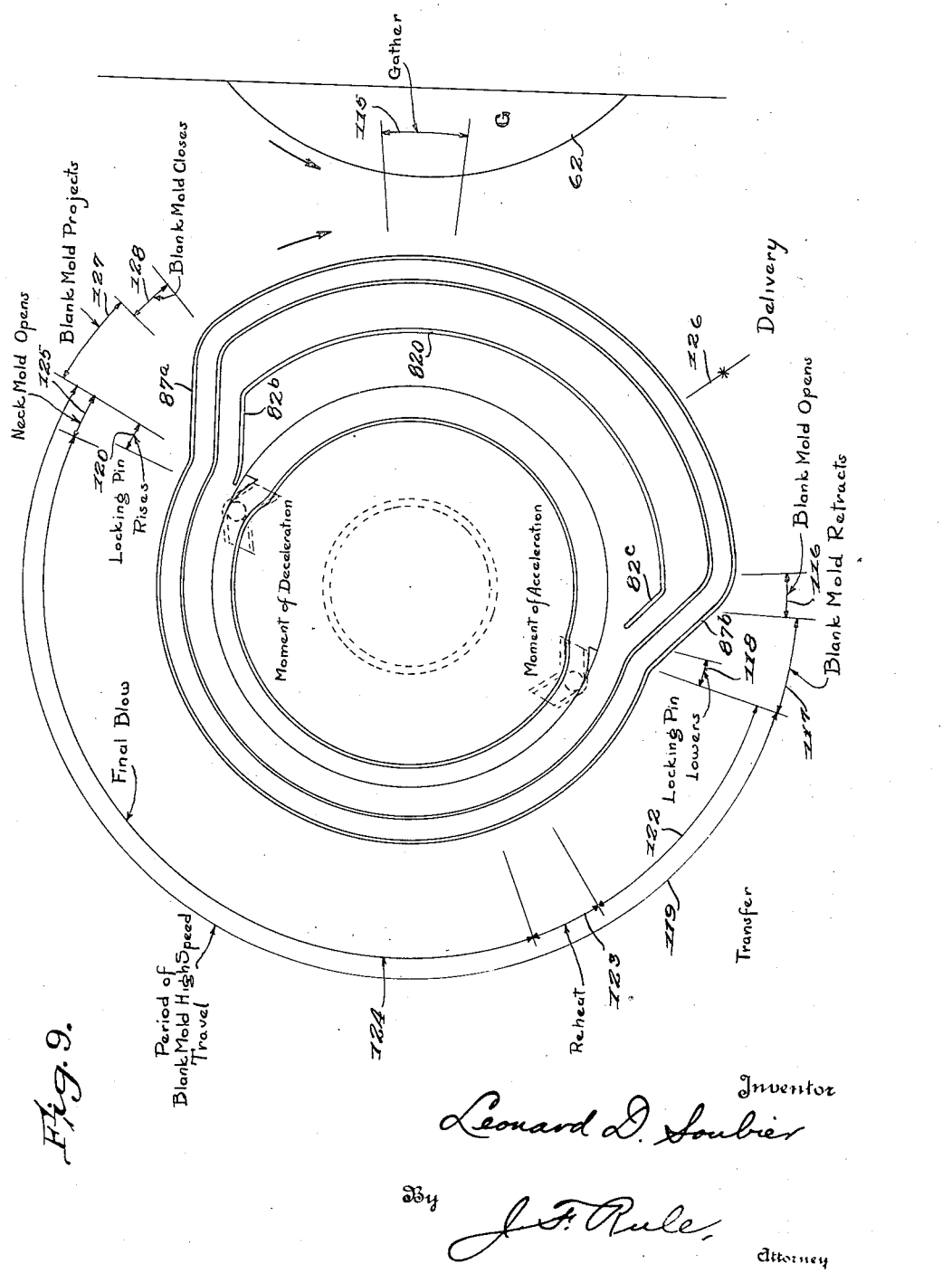

Patented May 30, 1933

1,912,018

UNITED STATES PATENT OFFICE

LEONARD D. SOUBIER, OF TOLEDO, OHIO, ASSIGNOR TO OWENS-ILLINOIS GLASS COMPANY, A CORPORATION OF OHIO

MACHINE FOR FORMING HOLLOW GLASS ARTICLES

Application filed June 27, 1930. Serial No. 464,374.

My invention relates to machines for making hollow glass articles, such as bottles, jars and the like, and particularly to the type of machines in which the charges of glass are first introduced into parison molds and given a preliminary formation, the parisons thus formed being then transferred to finishing molds and blown to their final shape. It is customary in machines of the type indicated, to provide an equal number of blank molds and finishing molds, and as a glass article after being blown in the finishing mold must be retained therein for a substantial length of time to permit sufficient cooling of the article, the blank molds are empty and idle for a considerable portion of the time.

An object of the present invention is to provide a machine in which the blank molds are utilized to their full capacity, thereby greatly increasing the output of a machine comprising a given number of blank molds.

The invention in its preferred form comprises a machine in which a series of suction gathering blank molds and a series of finishing molds are all mounted for rotation about a central vertical column, the number of blank molds being less than that of the finishing molds. The blank molds during part of their rotation move at a higher speed than the finishing molds, the arrangement being such that the finishing molds are kept supplied with parisons by a comparatively small number of blank molds, permitting both the blank and finishing molds to be operated to full capacity.

Other features of the invention will appear hereinafter.

In the accompanying drawings:

Fig. 1 is a part sectional elevation of a machine constructed in accordance with my invention.

Fig. 2 is a sectional elevation on a larger scale of a portion of the mechanism comprising the right hand side of Fig. 1.

Fig. 3 is a fragmentary front elevation view showing one head or section of the machine.

Fig. 4 is a detail perspective view of a blank mold and its carrier.

Fig. 5 is a sectional plan view of the machine.

Fig. 6 is a fragmentary sectional plan showing two of the blank molds and their operating mechanisms.

Fig. 6—A is a detail view of a valve controlling the supply of air pressure and vacuum to the molds.

Figure 7:
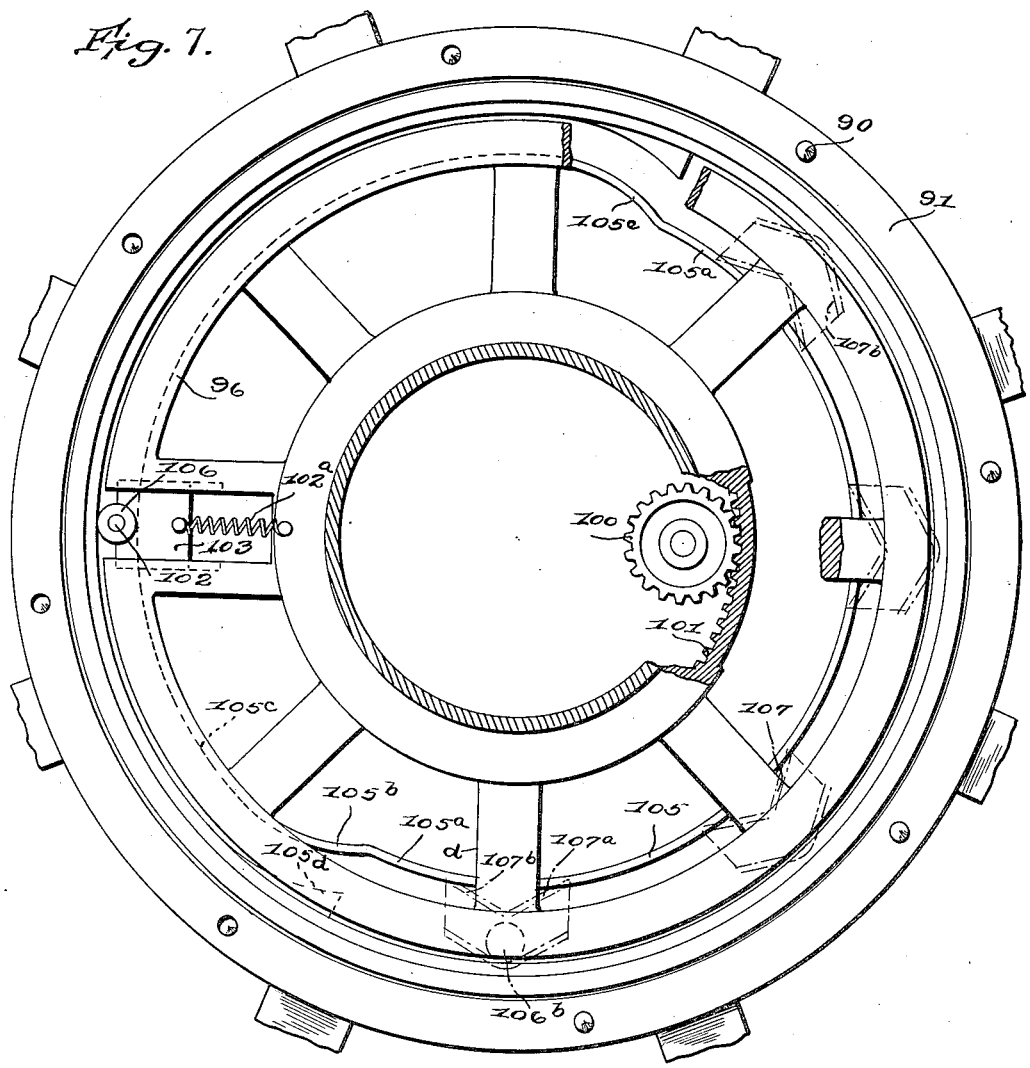

Fig. 7 is a sectional plan view showing the high speed plate and associated parts.

Figure 8:
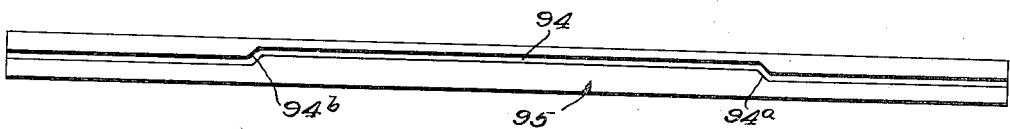

Fig. 8 is a view showing a development of the cam for actuating the locking pins.

Figure 9:
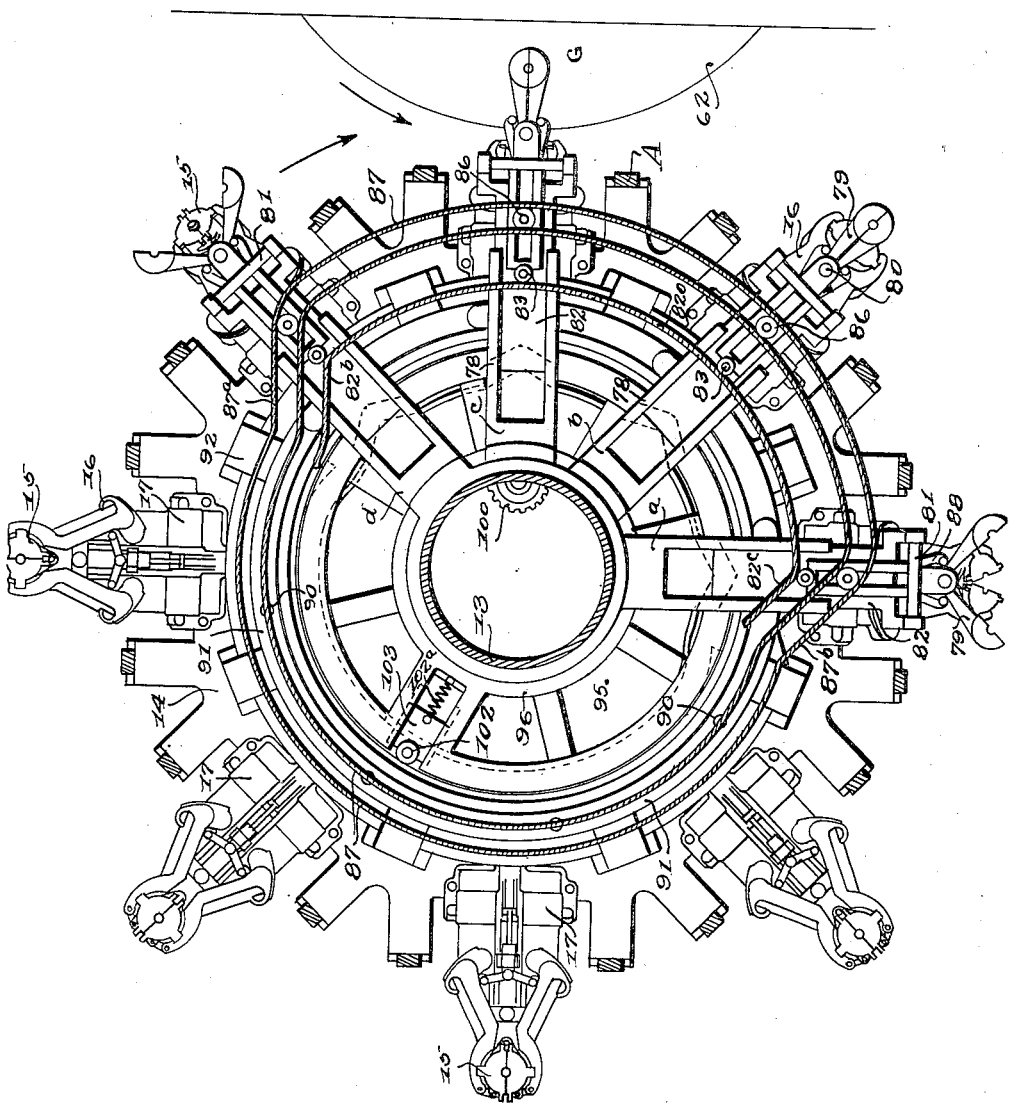

Fig. 9 is a diagrammatic view illustrating the duration and time relation of individual operations in a cycle of operations.

Referring to Fig. 1, the machine comprises a base 10 mounted on a wheeled truck or carriage 11. The center column of the machine includes a cylindrical section 12 integral with and forming part of the base 10, and a section 13 bolted to the section 12. Surrounding the stationary center column is a mold carriage 14 which carries an annular series of finishing molds 15. Each finishing mold is carried on a frame 16 having a pivotal connection 17 with the carriage, permitting the finishing molds to be swung up and down on the mold carriage in the usual manner. Each frame 16 carries a roll 18 running on a stationary cam track 19 for controlling the swinging movements of the frame 16. The mold carriage 14 is continuously rotated by a motor 20 operating thru gearing including a pinion 21 on the motor shaft which drives a gear 22 on a shaft 23 journaled in the base of the machine. On the shaft 23 is a pinion 24 which drives a bevel gear 25 on the lower end of a vertical shaft 26, to the upper end of which is secured a pinion 27 running in mesh with a ring gear 28 on the mold carriage 14.

Associated with each finishing mold is a neck mold group comprising a neck mold 30 mounted on the under surface of a combined suction and blowing head 31 (Figs. 2 and 3) carried on bracket arms 32 forming an integral part of a slide plate or frame 33 mounted for up and down movement in guideways formed in vertical arms 34. The arms 34 form part of a vertically disposed frame A comprising arms 35 bolted at their lower ends to the mold carriage 14, said frame including horizontally disposed sections 36 uniting the arms 35 and 34, and a cross-piece 37 adjacent the upper end of the frame. It will be understood that there is a frame A for each mold group.

Horizontal brace bars 38 are secured to and extend between the upper ends of the adjacent frames A. Tie rods 39 extend radially inward from the bars 38 and are attached at their inner ends to a cylinder 40 concentric with the vertical axis of the machine. The base of said cylinder is mounted in a drum or distributing head 41 rotatably supported on the upper end of the stationary central column of the machine. The distributing head comprises a vacuum chamber 42 and an air chamber 43 which are respectively in constant communication with a vacuum chamber 44 and air chamber 45 formed in the stationary central column of the machine. Air under pressure is supplied to the chamber 45 through a pipe 46 (Fig. 1) connected to any suitable source of air pressure (not shown). The air is exhausted from the vacuum chamber 44 thru a pipe 47 connected to a source of vacuum (not shown).

Each neck mold 30 comprises separable sections mounted to swing about a hinge pin 48, by which the neck mold is attached to the head 31. The opening and closing movements of the neck mold are effected by a cam actuated frame 49 having the usual operating connections with the neck mold, such as shown, for example, in the patent to Joseph B. Graham, No. 1,405,204, January 31, 1922. The frame 33 which carries the neck mold and head 31, is moved up and down for the purpose hereinafter set forth, by means of a cam 50 formed on a stationary cam plate or spider 51 mounted on the center column of the machine. A cam roll 52 running on the cam 50 is carried on a slide plate 53 slidable radially of the machine on guide rails 54 attached to the frame A. A bell crank lever 55 fulcrumed on a shaft 56 supported on brackets secured to the arms 34, has one arm thereof connected thru a link 57 to the slide plate 53. The other arm of the bell crank lever is connected to a vertical rod 58 which extends downward thru an opening formed in a lug on the frame 33. An adjusting nut 59 is threaded on said rod and provides a support for the frame 33. By means of the nut 59, the frame 33 and parts carried thereby may be adjusted up and down. A coil spring 60 on the rod 57 provides a safety device permitting outward movement of the cam roll 52 without lifting the frame 33 in the event of an obstruction interfering with such lifting movement.

Blank molds 61 are periodically brought into register with the neck molds 30, as hereinafter more fully set forth. The parison mold, comprising a combined neck mold and blank mold, is then lowered into contact with the molten glass in a tank 62 and the air is exhausted from the mold to introduce a charge of glass in the usual manner. The application of air and vacuum to the mold is controlled by a three-way valve 63 (see Figs. 2 and 6—A). A rock arm 64 on the valve is connected thru a link 65 to a lever 66 mounted on the drum 41 and actuated by a stationary cam 67. When the valve is rocked to the position shown in Figs. 2 and 6—A, it establishes communication between a pipe 68 leading from the vacuum chamber 43 to the valve and a flexible pipe 69 extending downward from the valve to the head 31. The vacuum line continues thru the head 31 to the neck mold. A cylinder 70 is formed on the head 31 and has therein a piston 71 which carries a plunger 72 adapted to enter the neck mold and form with the latter a neck mold cavity. When the suction line is established, as above described, the air is exhausted from beneath the piston 71 so that the plunger moves downward to operative position. At the same time, the air is exhausted from the blank mold so that the glass is drawn in and forms a parison.

After the blank mold is filled, it is lifted as hereinafter explained and a knife 73 operates in the usual manner to sever the glass. The knife is carried on the lower end of a vertical rock shaft 74 which is rocked by means of a rack 75 which engages a pinion on the rock shaft. The rack is actuated in the usual way by a cam 76 formed on the under surface of the cam plate 51.

After the knife has operated to sever the glass, it is temporarily held against the bottom of the mold to form a closure therefor while air pressure is momentarily applied through the neck mold. The air pressure line is established by rocking the valve arm 64 to the left and thereby rotating the valve so that the pipe 69 is brought into communication with a pipe 77 which leads from the valve to the air pressure chamber 43. The air pressure thus supplied to the head 31 forces the piston 71 upward, thereby withdrawing the plunger 72 while the air pressure is applied at the same time to the glass in the mold.

In accordance with the present invention, the number of blank molds is less than the number of neck molds and finishing molds. In the construction shown, eight finishing molds and four blank molds are provided, although this number may be varied. The blank molds are carried on individual carriers or frames, each of which is rotatable about the vertical axis of the machine at different speeds and relative to the finishing mold carriage. Each blank mold carrier during a complete rotation travels through a predetermined arc with the finishing mold carriage, being locked thereto, and then advances at an accelerated speed during the remainder of said revolution.

The blank mold carriers and the mechanism for operating them will now be described. Mounted for rotation about the center column of the machine are four blank mold carriers $a$, $b$, $c$ and $d$, each comprising a hub or ring surrounding the column 13 and an arm 78 extending radially outward therefrom. The arms 78 are all arranged in substantially the same horizontal plane, the hubs to which they are secured being stepped vertically and arranged one above another on the column 13. Each blank mold 61 comprises horizontally separable sections carried on a pair of mold arms 79 fulcrumed on a pivot pin 80 mounted in a frame 81. The frame 81 is mounted for up and down movement in vertical slideways formed in guide posts 82$^a$, the latter being formed integral with a slide plate 82, which is mounted in guideways formed on the arm 78 and is slidable lengthwise thereof in a direction radial to the machine axis. The sliding movement of the frame 82 is controlled by a cam 820 which engages a roll 83 on the frame 81.

The cam 820 is formed on the under surface of a stationary cam spider 84 mounted on the center column 13. The frame 81 is held in its elevated position relative to the frame 82 by springs 81$^a$ (Fig. 4) which permit the frame 81 and blank mold to be lowered for the gathering operation as hereinafter described. Mounted in the frame 81 for movement lengthwise thereof is a slide block 85 carrying a roll 86 which engages a cam 87 on the spider 84. Links 88 extend from the mold arms 79 to a pin 89 depending from the slide block 85. The opening and closing movements of the blank mold are effected by the relative movements of the slide block 85 and frame 81 radially of the machine, as more fully pointed out later.

Each blank mold carrier is locked to the finishing mold carriage 14 during a portion of its rotation and then released and driven at a comparatively high speed during the remainder of its rotation. Such locking means comprises locking pins 90 mounted for vertical movement in a locking ring 91 carried on bracket arms 92 bolted to the mold carriage 14. Each locking pin carries a roll 93 running in a cam groove 94 formed in a stationary cam plate 95. The cam groove 94, as shown in Fig. 8, comprises an inclined section 94$^a$ for lifting the locking pin to a locking position, and an inclined section 94$^b$ for lowering the locking pin. The locking pin when lifted enters an opening formed in the arm 78, thereby locking the blank mold carrier to the fiinishing mold carriage for rotation therewith until the locking pin is withdrawn permitting the speed of the blank mold carrier to be accelerated.

The means for driving the blank mold carriers at an accelerated speed comprises a driving element 96 in the form of a disk or spider mounted for continuous rotation about the center column 13 at a constant speed which is considerably greater than that of the mold carriage 14. The driving element 96, hereinafter referred to as the high speed disk, is geared to the motor 20 as shown in Fig. 1. The gearing includes a pinion 97 which is secured to the shaft 23 and drives a gear 98 on the lower end of a vertical shaft 99, to the upper end of which is secured a gear 100 running in mesh with an annular gear 101 formed on the high speed disk 96. The gearing is so proportioned that the disk 96 is driven at eight times the angular speed of the finishing mold carriage 14.

The high speed disk 96 during each complete rotation picks up one of the blank mold carriers and causes it to travel with the disk a predetermined distance and then releases it. The means for connecting a blank mold carrier with the high speed disk comprises a connector 102 including a slide block 103 slidable radially of the machine in guideways formed in the high speed disk 96. A cam roll 104 on said connector runs on a cam track 105 (see Figs. 2 and 7) formed on the stationary cam plate 95. In the operation of connecting a blank mold carrier to the high speed disk, a cam roll 106 on the connector 102 is adapted to enter a cam groove 107 formed on the under face of the arm 78 of said carrier. Each cam track or groove 107 comprises a section 107$^a$ inclined forwardly and outwardly relative to its direction of movement, through which section the roll 106 travels during the operation of connecting the blank mold carrier with the high speed disk. As will presently appear, the blank mold carrier is accelerated from the speed of the finishing mold carriage to that of the high speed disk during the movement of the roll 106 through the cam section 107$^a$. The stationary cam 105 comprises a section 105$^a$ concentric with the axis of the machine which determines the innermost position of the connector 102 while the latter is running free or disconnected from the blank mold carriers. At the point at which the connector 102 picks up a blank mold carrier, the cam 105 comprises an outwardly curved section 105$^b$. It will be understood that the connector picks up a blank mold carrier at this point each time the high speed disk makes a complete revolution. The parts are so arranged that at the moment the connector reaches the cam section 105$^b$, a blank mold carrier arm 78 is over this cam section and the cam section 107$^a$ on said arm is over and in register with the stationary cam section 105$^b$. It should be noted that the cam section 107$^a$ on the blank mold carrying arm extends in a straight line while the stationary cam section 105$^b$ is curved, a vertical projection of the cam surface 107$^a$ being tangent to the cam section 105$^b$ at the moment said cam sections are in register and the connector roll 106 commences its travel along said sections. With this arrangement, a gradual acceleration of the arm 78 is permitted. During this acceleration the connector is advancing at a higher speed than the arm 78 so that the cam roll 106 is advancing along the cam section 107$^a$, but the rate of this advance along said section is gradually reduced until the roll reaches the end of the cam section 107$^a$, that is, the position 106$^b$ relative to the arm 107. This point is reached when the roll 106 reaches the end of the cam section 105$^b$ and commences its travel along the cam section 105$^c$ which is concentric with its axis of rotation. The cam section 105$^b$ includes a cam wall 105$^d$, the two cam walls being parallel so that the outward movement of the roll 106 is positively controlled, thereby controlling the acceleration of the blank mold carrier.

When the carrier $d$ has been rotated with the high speed disk through somewhat more than a half circle, it is released from said disk by means of a cam section 105$^e$ which curves inwardly from the dwell portion 105$^c$ to the dwell portion 105$^a$. As the roll 106 travels along the section 105$^e$ it is compelled to move along an inwardly inclined section 107$^b$ of the cam 107, thereby disconnecting the high speed disk from the blank mold carrier so that said disk runs free of the mold carriers until the connector is again brought to the connecting point for the next succeeding blank mold carrier. During the disconnection of the high speed disk from the blank mold carrier the speed of said carrier is gradually decelerated to that of the finishing mold carriage. The connector roll 106 is normally held to its cam 105 by a spring 102$^a$ which permits said roll to pass idly through the cam grooves 107 on the blank mold carriers intermediate the decelerating and accelerating stations. The cam section 94$^a$ (Fig. 8) for lifting the locking pins 90 is so located that each blank mold carrier will be locked to the finishing mold carriage substantially at the moment the roll 106 reaches the forward end of the cam section 105$^e$, that is, at the moment the high speed disk is entirely disconnected from the blank mold carrier. In like manner, the locking pin is retracted by the cam section 94$^b$ and releases the blank mold carrier from the finishing mold carriage at the moment the roll 106 reaches the cam section 105$^b$, thus permitting the blank mold carrier to accelerate.

While a blank mold carrier is traveling with the high speed disk, the frame 82 thereon is held in its retracted position by means of the cam 82$^a$. The blank mold is also held in open position by means of the cam 87. The blank mold in such position is free to clear the upright frames A on the finishing mold carriage. When the blank mold carrier is released from the high speed disk, the frame 82 is projected outward by an inclined section 82$^b$ of the cam on which the roll 83 runs. The blank mold is thus projected outward radially of the machine preliminary to the gathering operation. The slide block 85 which controls the opening and closing movement of the blank mold is also moved radially outward by a section 87$^a$ of the cam 87, but through a greater distance than the frame 82, owing to the greater length of the cam section 87$^a$, so that the blank mold is closed directly beneath the corresponding neck mold 30. When the blank mold reaches the gathering position over the tank 62, the frame 32 which carries the neck mold is moved downward by means of the cam 50, as hereinbefore explained, and at the same time forces the blank mold downward into gathering contact with the glass in the tank. This downward movement of the mold is assisted by an arm 111 on the frame 32, which arm engages a stop 112 on the frame 81. The stop 112 is adjustable vertically. The opening movement of the blank mold is controlled by an inclined cam section 87$^b$ and the inward movement of the mold carrying frame 82 is controlled by a cam section 82$^c$.

The operation is as follows:

The finishing mold carriage 14 is rotated continuously at a constant speed by the motor 20 (Fig. 1) operating through the gearing including the ring gear 28 on the mold carriage. The motor 20 also operates through gearing including pinion 100 to rotate the high speed disk 96 continuously at a constant speed which is eight times that of the finishing mold carriage, so that said disk makes a complete rotation during the time interval between successive gathering operations. The high speed disk during each complete rotation picks up the foremost of the four blank mold carriers $a$, $b$, $c$ and $d$ (Fig. 5), carries it at an accelerated speed through somewhat more than a half revolution about the machine axis and releases it at a position 45° behind the next preceding blank mold carrier.

The connection of the blank mold carrier with the high speed disk is effected, as heretofore described, by the engagement of the connector 102 (Figs. 2 and 7) with the inclined cam groove 107 on the under face of the mold carrier arm. As the roll 106 on the connector enters the cam groove, the locking pin 90 is withdrawn from the carrier arm by the stationary cam 94, thus releasing said arm from the finishing mold carriage. When the high speed movement is completed and the connector 102 releases the blank mold carrier, another locking pin 90 is projected to again connect said carrier with the finishing mold carriage.

The cycle of operations will now be traced with particular reference to Fig. 9 which illustrates diagrammatically the order and length of time of the several operations. Commencing with the parts in the Fig. 2 position, the blank mold 61 is in dip and has just received its charge. At this time the valve 63 is in the position shown in Fig. 6—A so that a vacuum line is established from the vacuum chamber 42 through said valve to the head 31, neck mold 30 and blank mold. The blank mold remains in dip during its travel through the arc 115, Fig. 9. The cam 50 then operates to lift the dip head frame 32, permitting the blank mold to be lifted out of dip by the springs 81ᵃ (Fig. 4). As the mold lifts, the valve 63 is moved to neutral position to cut off the suction. At the same time, the knife 73 is operated by means of its cam 76 to sever the glass and form a temporary bottom plate for the mold. The valve 63 may now be moved by its cam into position to momentarily connect the head 31 with the air pressure chamber 43, thereby supplying air pressure to the blank and neck molds for the usual compacting blow. The valve is then moved to neutral position. When air pressure is admitted to the head 31 it moves the piston 71 upward, permitting the air pressure to be applied to the parison for expanding it in the mold. The blank mold remains closed during its travel through a predetermined distance beyond the gathering tank 62, permitting the required cooling of the blank, and is then opened as it travels through the arc 116 (Fig. 9). This opening of the blank mold is effected by the cam section 87ᵇ operating to move the slide block 85 inward relative to the mold carrying frame 81. The blank mold is also moved inward toward the center of the machine by the cam section 82ᶜ, this retraction of the mold taking place during its travel through the arc 117. When the mold is thus retracted it is also disconnected from the finishing mold frame by the operation of the cam 94 lowering the locking pin 90. The time of this operation is indicated by the arc 118. Immediately following the release of the blank mold carrier from the finishing mold carriage, said carrier is connected to and moved with the high speed disk through the arc 119 and then released from the high speed disk and again connected with the finishing mold carriage by the lifting of a locking pin at the arc 120. It will be noted that the connection of the blank mold carrier with the finishing mold carriage is at a point on the finishing mold carriage 180° in advance of the point of disconnection. Thus, the blank mold cooperates alternately with two finishing molds at diametrically opposite points on the finishing mold carriage.

Closely following the opening of the blank mold (just prior to its high speed movement) a finishing mold 15 is swung upward to surround the bare blank suspended from the neck mold and is closed around the blank, this closing movement being effected by a cam 121 (Fig. 1) operating through the usual connections. The parison is thus transferred to the finishing mold, this transfer taking place during its travel through the arc 122 (Fig. 9). Reheating of the enclosed blank now takes place during a short period represented by the arc 123, prior to the final blowing operation. The valve 63 is now moved by its cam into position to again establish the air pressure line to the head 31, so that air under pressure is applied to the parison and blows it to its final form in the finishing mold. The air pressure may be maintained during the travel of the mold through the arc 124. The valve 63 is then moved again to neutral position and the neck mold is opened (at the arc 125). The finishing mold with the blown artitcle therein now swings downward so that it can pass beneath the gathering tank. When the delivery point 126 is reached, the finishing mold opens and discharges the finished article.

Reverting now to the blank mold carrier which has been advanced at an accelerated speed and again connected to the finishing mold carriage, the blank mold, immediately following such connection, is projected radially outward by the cam section 82ᵇ and the blank mold is closed by the cam section 87ᵃ, the projection and closing movements of the mold being indicated respectively by the arcs 127 and 128. The blank mold is now directly beneath and in register with a neck mold 30. As the blank mold passes over the gathering tank 62, the cam 50 operates to lower the frame 32 so that the arm 111 thereon forces the blank mold carrying frame 81 downward against the tension of the springs 81ᵃ (Fig. 4), thereby lowering the blank mold into contact with the glass. The three-way valve 63 is then actuated by its cam 67 to establish a vacuum line from the vacuum chamber 43 to the head 31, neck mold and blank mold so that a charge of glass is drawn up by suction into the mold, thus completing the cycle of operations.

It will be seen that in the machine herein illustrated, each blank mold serves two finishing molds during each complete rotation of the finishing mold carriage. As each finishing mold always cooperates with the same blank mold, it will be seen that the machine is well adapted for making several kinds of ware concurrently.

Modifications may be resorted to within the spirit and scope of my invention.

What I claim is:

1. In a machine for forming glass articles, the combination of a series of blank molds, a series of finishing molds greater in number than the blank molds, means for revolving all of said molds about a common axis, means for introducing charges of glass into the blank molds in succession and forming parisons therein, and means for transferring the parisons from the blank molds to each of the finishing molds in succession.

2. In a machine for forming glass articles, the combination of a series of blank molds traveling in a closed path, a series of finishing molds traveling in a closed path concentric with said first mentioned path, and means cooperating with said molds for transferring blanks from each blank mold to a plurality of the finishing molds in succession.

3. In a machine for forming glass articles, the combination of a series of neck molds, a series of finishing molds individual to the neck molds, a series of blank molds, means for causing each blank mold to register successively with a plurality of said neck molds, means for lowering the registered blank and neck molds to a charge gathering position and introducing charges of glass by suction into the blank and neck molds while in register in said gathering position, and means for transferring the parisons formed in the blank and neck molds, to the finishing molds.

4. In a machine for forming glass articles, the combination of a neck mold, a blank mold, means for bodily moving the blank mold as a unit laterally relative to the neck mold into and out of a position beneath and in register with the neck mold, means for introducing a charge of glass into the blank mold while in said position in register with the neck mold, a finishing mold, and means for moving the finishing mold up and down into and out of register with the neck mold.

5. In a machine for forming glass articles, the combination of a mold carriage, a neck mold thereon, means for rotating said carriage and mold continuously about a vertical axis at a constant speed, a blank mold, means for continuously rotating the blank mold about said axis, means for causing the blank mold to register periodically with the neck mold and travel therewith through a predetermined distance, and means for periodically changing the speed of rotation of the blank mold about said axis and causing the blank mold to make a complete rotation relative to the mold carriage about said axis between successive registrations with the neck mold.

6. In a machine for forming glass articles, the combination of a mold carriage rotatable about a vertical axis, an annular series of neck molds thereon, an annular series of finishing molds individual to the neck molds, a series of blank molds less in number than the neck molds, and means for rotating the blank molds about said axis relative to said mold carriage and thereby causing each blank mold to be brought into alignment with a plurality of the neck molds in succession.

7. In a machine for forming glass articles, the combination of a mold carriage, a series of molds thereon, a plurality of mold carriers, blank molds thereon, means for rotating the mold carriage, and means for individually rotating the mold carriers about the axis of rotation of the mold carriage, each said carrier being rotated independently of the others and relative to the mold carriage, thereby bringing each blank mold into cooperative relation to a plurality of the molds on said carriage in succession.

8. In a machine for forming glass articles, the combination of a mold carriage, means for rotating it continuously at a constant speed about a vertical axis, an annular series of molds thereon, carriers mounted for rotation about said axis, blank molds on said carriers, means for connecting each said carrier to said carriage for rotation therewith during a predetermined portion of each complete rotation of the carrier, and means for rotating each said carrier at an accelerated speed during the remaining portion of its rotation and carrying the blank mold thereon from registration with one to registration with another of said first mentioned molds.

9. In a machine for forming glass articles, the combination of a mold carriage, means for rotating it continuously at a constant speed about a vertical axis, an annular series of molds thereon, blank mold carriers mounted for rotation about said axis, blank molds on said carriers, means for periodically locking each said carrier to the mold carriage for rotation therewith through a predetermined distance, means for releasing said carriers from the mold carriage, and means for rotating each of said carriers in succession at an accelerated speed through a predetermined distance.

10. A machine for forming glass articles comprising, in combination, a stationary central column, mold carriers mounted for rotation about said column, molds on said carriers, each said carrier comprising a ring or hub mounted on the column and a radially extending arm, said arms being arranged in substantially the same plane and said rings being mounted one above another, and mechanism for continuously rotating all of said carriers and the molds thereon about the axis of said column including means for periodically accelerating the speed of rotation of the carriers in succession.

11. In a glass forming machine, the combination of a mold carrier rotatable about a vertical axis, said carrier including an arm extending radially of the machine, a slide plate mounted on said arm for reciprocating movement in a direction radial to said axis, a frame mounted on said slide plate and movable up and down thereon, a mold carried by said frame, and means for opening and closing the mold.

12. In a glass forming machine, the combination of a mold carrier rotatable about a vertical axis, said carrier including an arm extending radially of the machine, a slide plate mounted on said arm for reciprocating movement in a direction radial to said axis, a frame mounted on said slide plate and movable up and down thereon, a mold carried by said frame, a slide block carried by said frame, operating connections between said slide block and the mold for opening and closing the latter, and stationary cams controlling the said movements of said slide plate and slide block.

13. In a machine for forming glass articles, the combination of a mold carriage, an annular series of molds thereon, means for rotating the carriage about a vertical axis, blank mold carriers mounted for rotation about said axis and each comprising an arm extending radially of said axis, a blank mold carried by each said arm, means for periodically connecting each carrier with the mold carriage to rotate therewith, the molds on said carriers being in register with molds on said carriage while the carriers are connected to said carriage, means for periodically releasing each carrier and rotating it at an accelerated speed to an advanced position relative to the mold carriage and maintaining it in said advanced position until again rotated at an accelerated speed, and means for moving the blank molds inward on their carriers to a retracted position and holding them in such position during the accelerated movement of the carriers.

14. The combination of a plurality of mold carriers rotatable about a vertical axis, molds on said carriers, a high speed driving element, a low speed driving element, means for rotating said elements continuously about said axis, means for connecting said mold carriers in succession to said high speed driving element and causing them to be driven by said high speed element through a predetermined arc, means for releasing the mold carriers from said high speed element, and means for connecting the mold carriers in succession to said low speed driving element.

15. The combination of a plurality of mold carriers rotatable about a vertical axis, molds on said carriers, a high speed driving element, means for rotating said element continuously about said axis, means for connecting said mold carriers in succession to said high speed driving element and causing them to be driven by said element through a predetermined arc, means for releasing the mold carriers from said driving element, and means for rotating each mold carrier about said axis at a comparatively slow speed during the time intervals it is disconnected from the high speed element.

16. In a machine for forming glass articles, the combination of a mold carriage, a mold thereon, means for rotating the carriage about a vertical axis at a predetermined speed, a blank mold carrier rotatable about said axis, a blank mold thereon, a high speed driving element, means for rotating said element continuously about said axis at a higher speed than that of said mold carriage, means for periodically connecting said blank mold carrier to said high speed element for rotation therewith and disconnecting it therefrom, and means for causing said carrier to rotate with said mold carriage while disconnected from the high speed driving element.

17. In a machine for forming glass articles, the combination of a mold carriage, a mold thereon, means for rotating the carriage about a vertical axis at a predetermined speed, a blank mold carrier rotatable about said axis, a blank mold thereon, a high speed driving element, means for rotating said element continuously about said axis at a higher speed than that of said mold carriage, means for periodically connecting said blank mold carrier to said high speed element for rotation therewith and disconnecting it therefrom, and means for causing said carrier to rotate with said mold carriage while disconnected from the high speed driving element, said connecting and disconnecting means comprising mechanism operable to cause a gradual acceleration and deceleration of the blank mold carrier while being connected to and disconnected from the high speed driving element.

18. In a machine for forming glass articles, the combination of a series of blank molds, a series of finishing molds, and mechanism for rotating all of said molds about a common axis including means for effecting a relative rotation of the blank molds and finishing molds about said axis, by which each blank mold is caused to register with a plurality of the finishing molds in succession.

19. In a machine for forming glass articles, the combination of a mold carriage, a plurality of finishing molds thereon, means for rotating said carriage about an axis, a blank mold, and means for rotating the blank mold about said axis and causing it to advance relatively to the mold carriage and register with a plurality of finishing molds in succession.

20. A machine for forming glass articles comprising, in combination, a mold carriage rotatable about a vertical axis, a plurality of finishing molds thereon, a blank mold, means for causing the blank mold to register with a plurality of the finishing molds in succession and travel with each finishing mold through a predetermined distance, and means for rotating the blank mold at an accelerated speed about said axis during the intervals that it is out of register with the finishing molds.

21. In a machine for forming glass articles, the combination of a series of neck molds, a series of finishing molds individual to the neck molds, a series of blank molds, means for causing each blank mold to register successively with a plurality of said neck molds, means for introducing charges of molten glass by suction into the blank and neck molds while in register and form parisons therein, and means for transferring the parisons to the finishing molds while supported in the neck molds.

22. The combination of a mold carriage, finishing molds thereon, means for rotating said carriage continuously at a constant speed about a vertical axis, a high speed driving element, means for rotating it continuously about said axis at a higher speed than that of the mold carriage, a plurality of blank molds, and means for connecting each blank mold alternately to said mold carriage and said driving element and causing it to advance at the same angular speed as the mold carriage and said driving element, respectively, while connected thereto.

23. The combination of a mold carriage, finishing molds thereon, means for rotating said carriage continuously at a constant speed about a vertical axis, a high speed driving element, means for rotating it continuously about said axis at a higher speed than that of the mold carriage, a plurality of blank molds, means for connecting each blank mold alternately to said mold carriage and said driving element and causing it to advance at the same angular speed as the mold carriage and said driving element, respectively, while connected thereto, and means for automatically transferring parisons from each blank mold to a plurality of finishing molds in succession, each said transfer of a parison being effected while the blank mold is connected to travel with said mold carriage.

Signed at Toledo, Ohio, this 25 day of June 1930.

LEONARD D. SOUBIER.